US006907690B1

(12) United States Patent
Stallings

(10) Patent No.: US 6,907,690 B1
(45) Date of Patent: Jun. 21, 2005

(54) ENVIRONMENTALLY FRIENDLY INSECT ERADICATION METHOD AND APPARATUS

(76) Inventor: Jimmie L. Stallings, 11438 N. 96th East Ave., Owasso, OK (US) 74055

( * ) Notice: Subject to any disclaimer, the term of this patent is extended or adjusted under 35 U.S.C. 154(b) by 0 days.

(21) Appl. No.: 10/620,522

(22) Filed: Jul. 16, 2003

Related U.S. Application Data

(63) Continuation-in-part of application No. 10/423,679, filed on Apr. 25, 2003.

(51) Int. Cl.[7] .......................... A01M 7/00; A01M 3/00
(52) U.S. Cl. ...................... 43/132.1; 43/141; 47/57.5; 47/58.1 R
(58) Field of Search .............................. 43/124, 132.1, 43/141; 222/402.1, 402.11, 402.13, 402.16; 47/57.5, 8, 32.6, 1.01 R, 58.1 R

(56) References Cited

U.S. PATENT DOCUMENTS

| | | | | |
|---|---|---|---|---|
| 1,140,453 A | | 5/1915 | Frank | 222/385 |
| 1,163,635 A | | 12/1915 | Baldwin | 239/315 |
| 1,297,622 A | | 3/1919 | Whittaker | 239/13 |
| 1,727,457 A | * | 9/1929 | Van Meter | 43/124 |
| 1,756,453 A | * | 4/1930 | Davey et al. | 47/57.5 |
| 2,114,494 A | * | 4/1938 | Hummel et al. | 43/132.1 |
| 2,130,041 A | * | 9/1938 | Slaughter | 43/141 |
| 2,258,693 A | * | 10/1941 | Yahres | 47/57.5 |
| 2,968,441 A | * | 1/1961 | Holcomb | 222/402.1 |
| 3,064,696 A | * | 11/1962 | Gruenewald | 222/402.16 |
| 3,130,519 A | * | 4/1964 | Mauget | 47/57.5 |
| 3,286,400 A | * | 11/1966 | Gruenewaelder | 47/57.5 |
| 3,286,401 A | * | 11/1966 | Mauget | 47/57.5 |
| 3,322,623 A | * | 5/1967 | Doakley | 43/132.1 |
| 3,330,447 A | * | 7/1967 | Doblin | 222/402.13 |
| 3,368,302 A | * | 2/1968 | Martino | 222/402.1 |
| 3,404,814 A | * | 10/1968 | Wakeman | 222/402.13 |
| 3,459,342 A | * | 8/1969 | Manning | 222/402.13 |
| 3,659,755 A | * | 5/1972 | Prussin et al. | 222/402.13 |
| 3,666,148 A | * | 5/1972 | Webster | 222/402.1 |
| 3,684,185 A | * | 8/1972 | Milcos | 222/402.1 |
| 3,726,445 A | * | 4/1973 | Ostrowsky et al. | 222/402.11 |
| 3,785,335 A | * | 1/1974 | Wagner | 222/402.1 |
| 3,785,528 A | * | 1/1974 | Mandeltort | 222/402.13 |

(Continued)

FOREIGN PATENT DOCUMENTS

| | | | | |
|---|---|---|---|---|
| DE | | 424115 A1 * | 1/1926 | 43/124 |

(Continued)

*Primary Examiner*—Darren W. Ark
(74) *Attorney, Agent, or Firm*—Head, Johnson & Kachigian

(57) ABSTRACT

An environmentally friendly insect eradication method and apparatus for removing invasive insects from tunnels bored through and within trees and other similarly composed structures by providing a canister containing a pressurized, non-flammable, non-ozone depleting fluorocarbon propellent disposed therein with the propellent having a pre-use internal pressure in the approximate range of about 75 psig to 150 psig and where the pressure is sufficient to introduce some or all of the propellent into the internal portion of an insect tunnel bored in an invaded structure. A gas introduction nozzle is inserted into an entrance or exiting insect bore in such a manner so as to cause a valve mechanism, in operative communication with the nozzle and cannister to be displaced and allow the propellent to exit the canister and enter the internal portion of the invaded insect bore to displace or otherwise eradicate the insect.

4 Claims, 4 Drawing Sheets

U.S. PATENT DOCUMENTS

| | | | | |
|---|---|---|---|---|
| 3,841,555 | A | 10/1974 | Lilja | 239/8 |
| 3,993,245 | A | 11/1976 | Smith | 239/8 |
| 4,090,328 | A * | 5/1978 | Enos, Jr. | 47/57.5 |
| 4,354,621 | A * | 10/1982 | Knickerbocker | 222/402.13 |
| 4,413,756 | A * | 11/1983 | Kirley | 43/132.1 |
| 4,471,561 | A | 9/1984 | Lapierre | 43/108 |
| 4,534,128 | A * | 8/1985 | Query et al. | 43/132.1 |
| 4,546,905 | A * | 10/1985 | Nandagiri et al. | 222/402.1 |
| 4,594,807 | A * | 6/1986 | McQueen | 43/132.1 |
| 4,645,128 | A | 2/1987 | Graber | 239/223 |
| 4,648,202 | A * | 3/1987 | Renth | 43/132.1 |
| 4,666,062 | A * | 5/1987 | Pershall | 222/402.1 |
| 4,724,793 | A * | 2/1988 | Sletten | 47/57.5 |
| 4,754,897 | A * | 7/1988 | Brace | 222/402.16 |
| 4,775,081 | A * | 10/1988 | Morane | 222/402.13 |
| 4,781,329 | A | 11/1988 | Tenney et al. | 239/305 |
| 4,805,341 | A * | 2/1989 | Maeda | 43/132.1 |
| 4,807,545 | A | 2/1989 | Joy | 111/7.1 |
| 4,809,462 | A * | 3/1989 | Maeda | 43/132.1 |
| 4,823,505 | A * | 4/1989 | Jackson | 43/124 |
| 4,833,818 | A * | 5/1989 | Berta | 43/132.1 |
| 4,920,996 | A | 5/1990 | Flanner | 134/22.11 |
| 4,940,171 | A * | 7/1990 | Gilroy | 222/402.1 |
| 4,941,600 | A * | 7/1990 | Berriochoa et al. | 222/402.13 |
| 4,948,390 | A | 8/1990 | Sola | 95/19 |
| 4,989,364 | A | 2/1991 | Chaudoin et al. | 43/125 |
| 5,050,338 | A * | 9/1991 | Doakley et al. | 43/132.1 |
| 5,054,231 | A * | 10/1991 | Witherspoon | 43/132.1 |
| 5,058,312 | A * | 10/1991 | Jackson | 43/132.1 |
| 5,060,823 | A * | 10/1991 | Perlman | 222/402.1 |
| 5,076,315 | A | 12/1991 | King | 137/268 |
| 5,109,628 | A * | 5/1992 | Ellefson | 43/124 |
| 5,122,364 | A * | 6/1992 | Portas | 43/124 |
| 5,143,263 | A | 9/1992 | Newell | 222/402.1 |
| 5,148,627 | A | 9/1992 | Thomas | 43/132.1 |
| 5,154,323 | A * | 10/1992 | Query et al. | 222/402.13 |
| 5,165,199 | A * | 11/1992 | Tallon | 43/132.1 |
| 5,171,613 | A | 12/1992 | Bok et al. | 427/422 |
| 5,211,317 | A * | 5/1993 | Diamond et al. | 222/402.1 |
| 5,217,160 | A | 6/1993 | Lopes | 239/8 |
| 5,224,630 | A * | 7/1993 | Pope et al. | 222/402.1 |
| 5,240,708 | A | 8/1993 | Plummer et al. | 424/405 |
| 5,249,391 | A * | 10/1993 | Rodgers | 47/57.5 |
| 5,279,256 | A * | 1/1994 | Brite | 43/141 |
| 5,299,737 | A | 4/1994 | McGinnis et al. | 239/77 |
| 5,301,457 | A * | 4/1994 | Seely | 43/132.1 |
| 5,309,669 | A * | 5/1994 | Jackson | 43/124 |
| 5,326,002 | A * | 7/1994 | Dubini | 222/402.1 |
| 5,355,619 | A * | 10/1994 | West et al. | 47/57.5 |
| 5,403,417 | A | 4/1995 | Dudley et al. | 156/97 |
| 5,467,902 | A * | 11/1995 | Yquel | 222/402.1 |
| 5,471,784 | A * | 12/1995 | Merving | 47/57.5 |
| 5,474,758 | A * | 12/1995 | Kwon | 222/402.1 |
| 5,542,207 | A * | 8/1996 | Morris, Sr. | 43/132.1 |
| 5,586,695 | A * | 12/1996 | Labus et al. | 222/402.1 |
| 5,605,400 | A | 2/1997 | Kojima | 366/339 |
| 5,611,466 | A * | 3/1997 | Hsiao | 222/402.13 |
| 5,628,432 | A * | 5/1997 | Mosley | 222/402.1 |
| 5,711,484 | A * | 1/1998 | Blette et al. | 222/402.1 |
| 5,759,561 | A | 6/1998 | Angst et al. | 424/407 |
| 5,765,601 | A * | 6/1998 | Wells et al. | 222/402.13 |
| 5,768,907 | A * | 6/1998 | Lee | 43/132.1 |
| 5,817,293 | A * | 10/1998 | Akehurst et al. | 222/402.1 |
| 5,878,912 | A * | 3/1999 | Stein | 222/402.1 |
| 5,881,493 | A * | 3/1999 | Restive | 43/132.1 |
| 6,003,787 | A | 12/1999 | Fisher | 239/373 |
| 6,094,773 | A | 8/2000 | Krentz et al. | 15/321 |
| 6,155,351 | A | 12/2000 | Breedlove et al. | 169/14 |
| 6,199,766 | B1 * | 3/2001 | Fox et al. | 43/132.1 |
| 6,202,899 | B1 * | 3/2001 | Lasserre et al. | 222/402.1 |
| 6,318,603 | B1 * | 11/2001 | Burt | 222/402.1 |
| 6,325,304 | B1 * | 12/2001 | Brite et al. | 43/132.1 |
| 6,352,184 | B1 * | 3/2002 | Stern et al. | 222/402.1 |
| 6,382,469 | B1 * | 5/2002 | Carter et al. | 222/402.13 |
| 6,394,365 | B1 | 5/2002 | Jeanfreau | 239/373 |
| 6,484,440 | B2 * | 11/2002 | Brown | 47/57.5 |
| 6,506,556 | B2 | 1/2003 | Treacy | 435/5 |
| 6,688,036 | B1 * | 2/2004 | Gunn | 43/132.1 |
| 2002/0144454 | A1 * | 10/2002 | Seniff | 43/141 |
| 2002/0194775 | A1 * | 12/2002 | Ogram | 43/132.1 |
| 2003/0015191 | A1 * | 1/2003 | Armstrong et al. | 222/402.1 |
| 2003/0140550 | A1 * | 7/2003 | Seniff | 43/141 |
| 2003/0213162 | A1 * | 11/2003 | Eliasson et al. | 43/124 |

FOREIGN PATENT DOCUMENTS

| | | | | |
|---|---|---|---|---|
| DE | 4236718 | A1 * | 4/1994 | |
| EP | 594035 | A1 * | 1/1997 | |
| GB | 2248888 | A1 * | 4/1992 | |
| JP | 6284846 | A1 * | 10/1994 | 43/132.1 |
| JP | 8-156984 | A1 * | 6/1996 | |

* cited by examiner

ENVIRONMENTALLY FRIENDLY INSECT ERADICATION METHOD AND APPARATUS

REFERENCE TO PENDING APPLICATIONS

This application is a continuation-in-part patent application of co-pending application Ser. No. 10/423,679, filed Apr. 25, 2003 which is included by reference herein in its entirety.

REFERENCE TO MICROFICHE APPENDIX

This application is not referenced in any microfiche appendix.

TECHNICAL FIELD OF THE INVENTION

The invention is generally directed towards a device and method for eradicating or displacing insects. In particular, the instant invention relates to an environmentally friendly apparatus and method for operatively eradicating invasive insects from trees and other similar structures via introduction of a pressurized non-flammable, non-ozone depleting fluorocarbon propellant to the internal portion of a tree wherein that internal portion is a tunnel previously bored by an invasive insect.

BACKGROUND OF THE INVENTION

The instant invention is directed towards an apparatus and method for eradicating or displacing insects or larvae accommodated within a bored tunnel situated within the internal portion of a tree or other similarly composed structure.

The control of insects, particularly boring insects is one of man's oldest problems. During modern times, the most effective controls of insects has been through the use of toxic chemicals or insecticides. However, such insecticides have had serious side effects, such as the simultaneous killing of beneficial insects, such as bees and other insects which are predators of less beneficial pests. The widespread use of insecticides has further resulted in the killing of wildlife, such as birds and small rodents as well as detrimental effects to human kind (i.e. human exposure to DDT).

The instant invention teaches the utilization of a pressurized non-flammable non-ozone depleting fluorocarbon propellent which avoids the documented hazards associated with chlorofluorocarbon propellants found to present serious environmental and health risks. As early as the 1970's various studies have revealed that chlorofluorocarbons (CFC) are released into the atmosphere and accumulate in the stratosphere where they have a deleterious effect on the ozone layer, as stratospheric ozone shields living organisms on earth from the harmful effect of the sun's ultraviolet radiation. Even a relatively small decrease in the stratospheric ozone concentration can result in an increased incident of skin cancer in humans and in genetic damage in many organisms. In the stratosphere, CFC molecules break down by the action of solar ultraviolet radiation and release their constituent atoms. These then react with ozone molecules resulting in their removal.

Due to the growing concern relating to stratospheric ozone depletion and intended dangers a ban has been imposed on the use of CFC in aerosol dispensers in the late 1970s by the United States, Canada and Scandinavian countries. In 1990, 93 nations agreed to end production of ozone depleting chemicals by the end of the century and in 1992 most of the same countries agreed to end their production of CFC by the end of 1996. It is in keeping with the findings of these studies that the instant invention directs its focus to the utilization of non-chlorofluorocarbon content used in association with deployment of its propellant.

It is further noted that more modern efforts have tried to utilize biological means which control insects but do not harm other wildlife or beneficial insects. Such controls include the use of bacteria which infects only a specific insect being controlled. However, these biological controls do not appear to be the complete answer either. Though more friendly to the environment, not all insects have found susceptible to biological controls and in many cases, the control is not found completely effective.

Other species of insects have resisted all attempts to control them. Most particularly, those insects found to bore tunnels within, and sometime through the internal portion of trees. Applications of insecticide to these areas has proved to be most difficult and sometime affects the life cycle and health of the tree and other life forms in close proximity.

Other attempts to control insects by providing some degree of efficiency prove ineffective to control crawling insects. An obvious and readily apparent example of such alternative ineffectual insect controls would be electrical exterminators which are essentially a trap having an electrode grid surrounding an insect attracting element, such as a light. As the insects attempt to reach the light, they encounter electrodes which shorts out the insect's body thereby electrocuting the insect. Consequently, it would seem the electrical insect exterminators are limited to flying insects which would include moths, not necessarily caterpillars or larvae insects which bore through into trees prior to metamorphose into flying insects. These and other difficulties experienced with prior art devices have been obviated in a novel manner by the present invention. It is therefore an outstanding object of the instant invention to provide an environmentally sound and friendly method to eradicate or remove insects restively accommodated within a bored tunnel structure located in the internal portion of a tree or other similarly composed structures.

It is another object of the instant invention to provide an apparatus and means whereby effective and efficient application of the invention's practice may be facilitated in timely and rapid succession.

It is yet a further object of the instant invention to provide an apparatus and means whereby insects may be eradicated or removed from tunnels bored within the internal portion of a tree without damaging the tree's health or other nearby living organisms.

Yet a further object of the instant invention is to provide an apparatus which may be constructed for single use or multiple use applications.

An additional object of the instant invention is to provide an apparatus and method whereby insects residing within a tunnel bored into the internal portion of a tree may be eradicated or eliminated absent potential or adverse health effects to the operator of the apparatus.

Another object of the instant invention is to provide an apparatus and means to eradicate insects in the internal portion of the a tree or similarly structure utilizing an easily transportable and self-contained canister pressurized with propellent to an internal pre-use pressure from between 75 psig to 150 psig.

A further objective of the instant invention is to teach the deployment of the invention's propellent absent the adverse health potential risk of fluorocarbon deployment.

Yet another object of the instant invention is to disclose and teach method and apparatus to introduce a pressurized non-flammable, non-ozone depleting fluorocarbon propellent utilizing the introduction nozzle of the instant invention in combination with an existing cannister containing propellent.

Other objects and further scope of the applicability of the present invention will become apparent from the detailed description to follow, taken in conjunction with the accompanying drawings wherein like parts are designated by like reference numerals.

BRIEF SUMMARY OF THE INVENTION

An environmentally friendly insect eradication method, the method comprising the steps of providing a canister, said canister having a pressurized, non-flammable, non-ozone depleting fluorocarbon propellant disposed therein, the so disposed propellant causing the canister to have a pre-voided internal pressure within the approximate range of from about 75 psig to about 150 psig, wherein said pressure is sufficient to introduce essentially all of said propellant into the internal portion of a tree or other invaded structure via an entrance or exiting insect bore; and inserting a gas introduction nozzle provided with said canister into a tree or other invaded structure via an entrance or exiting insect bore in such a manner to operatively displace a valve mechanism connecting the nozzle and the canister to cause said propellant to enter the internal portion of a tree or other invaded structure and crush or otherwise displace an invasive insect accommodated therein.

As will be readily appreciated by those skilled in the art, other environmentally friendly gases may be used in association with the apparatus of the instant invention. However, through extensive experimentation it has been found the gas providing optimal performance and environmental compatibility is comprised of constituent components approximating those found in the aerosol propellant marketed as Dymel 134A and chemically defined as 1,1,1,2 tetrafluorethane.

Other objects and further scope of the applicability of the present invention will become apparent from the detailed description to follow, taken in conjunction with the accompanying drawings wherein like parts are designated by like reference numerals.

DETAILED DESCRIPTION OF THE DRAWINGS

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention. Rather, the instant invention is to be construed as limited only by the scope of the attached claim or claims, including the full range of equivalency to which each element thereof is entitled.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

Figure 1:
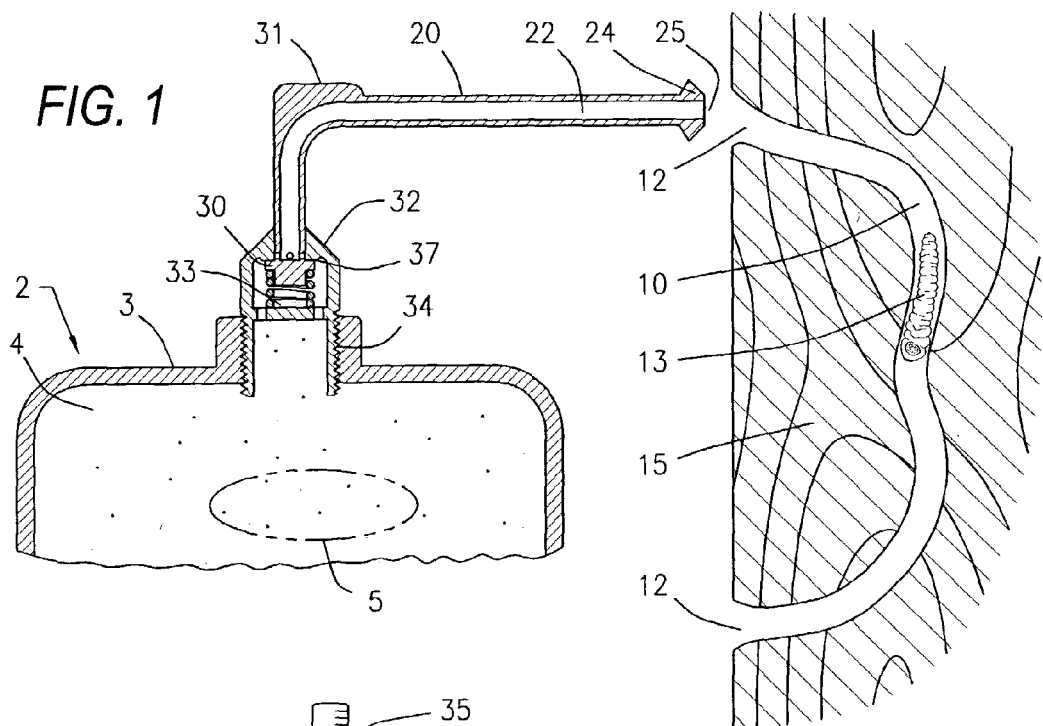
FIG. 1 is a cross-sectional illustration of the instant invention as practiced in conjunction with an insect tunnel bored within a tree or other similar structure.

FIG. 1 is a cross-sectional illustration of the instant invention as practiced in conjunction with an insect tunnel bored within a tree or other similar structure. Turning now to FIG. 1.

In FIG. 1 the instant invention is generally referred to as element 2. The invention's cannister 3 contains within its internal portion 4 a propellent 5. The propellent of the instant invention is a non-flammable, non-ozone depleting fluorocarbon propellent that is pressurized to a range of approximately 75 psi to 150 psi wherein the indicated pressure is sufficient to introduce essentially all of the propellent 5 to the internal portion of an insect tunnel 10 and thus displace an insect 13 residing within the internal portion of an invaded tree 15 or other similarly invaded structure. Extensive testing of the instant invention has shown that a pressurized non-flammable non-ozone depleting fluorocarbon propellent approximating the chemical composition of the aerosol propellent marketed under the name of Dymel 134A provides for a sufficient number of successive applications to rid most invaded structures of invasive insects.

In deploying the instant invention, a valve portion 30 is depressed to allow propellent introduction nozzle 20 to introduce propellent 5 through the nozzle 20 internal portion 22 which essentially forms a right angle upon exiting valve housing 32, exiting the introduction nozzle tip 24 and entering the internal portion of a tunnel 10 connected to an entrance or exiting insect bore 12. The traversing of the propellent 5 from the internal portion of the cannister 4 occurs via actuation of the invention's operational valve 30. The actuation of valve 30 is precipitated via downward pressure placed upon valve actuation portion 31 of introduction nozzle 20. This exiting/traversing flow of propellent 5 is further illustrated in FIG. 1A.

Figure 1A:
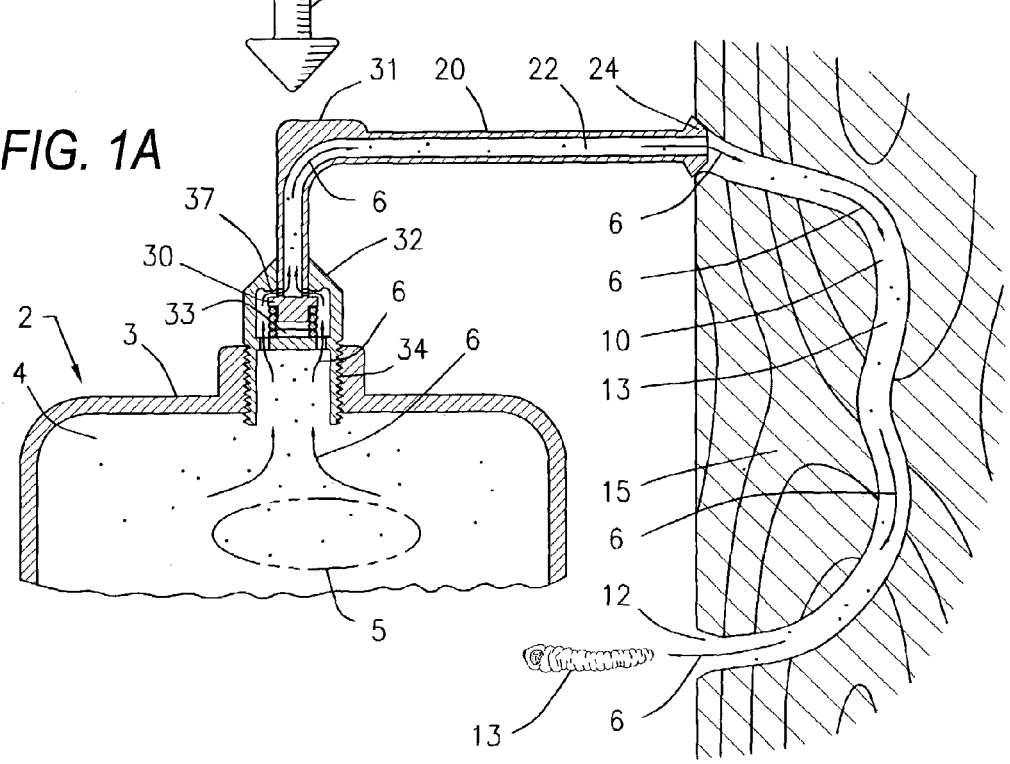
FIG. 1A is a cross-sectional illustration of the invention in FIG. 1 further detailing propellent exiting flow precipitated via deployment of the invention's valve mechanism.

FIG. 1A is a cross-sectional illustration of the invention in FIG. 1 further detailing propellent exiting flow precipitated via deployment of the invention's operational valve mechanism 30. Turning now to FIG. 1A.

In FIG. 1A a downward pressure (usually exerted by a human finger) is exerted in the direction referenced by element 35. The downward pressure 35 is placed upon an integrated valve actuation portion 31 of nozzle 20 and displaces operational valve 30 downwardly in a manner to unseat valve 30 from valve seat 37. Once displaced from valve seat 37 propellent 5 exits the internal portion 4 of the cannister 3 through a propellent passageway made possible via displacement of valve 30 from valve seat 37, allowing propellent 5 to pass around the displaced valve 30 into the internal portion 22 of the introduction nozzle 20, exiting said internal portion through nozzle tip orifice 25, entering an insect exiting or entrance bore 12 and further into the internal portion of invaded structure 15 causing a crushing or displacing force to be exerted upon insect 13 resulting in insect 13 being ejected through an exiting or entrance bore 12 or being crushed in place should an second entrance/exiting bore not be present.

Figure 2:
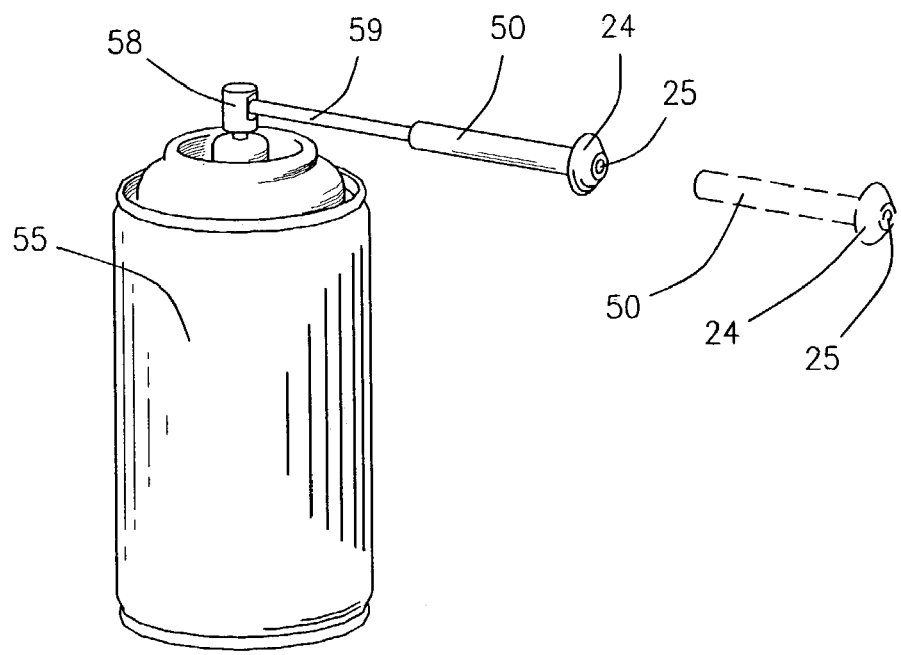
FIG. 2 is an illustration of an alternative embodiment of the instant invention wherein the nozzle of the invention may be used in conjunction with existing pressurized propellent sources.

FIG. 2 is an illustration of an alternative embodiment of the instant invention wherein a modified version of the invention nozzle may be used in conjunction with existing pressurized propellent sources. Turning now to FIG. 2.

In FIG. 2 the introduction nozzle of the invention is shown as 50 and is used in conjunction with an existing pressurized propellent source 55. Such sources are easily identified as any number of pressurized products including but not limited to pressurized air dispensers, air sprays, paint and the like. While absent the environmental friendly considerations of the preferred embodiment of the instant invention, this readily envisioned alternative embodiment may be used to communicate the contents of any pressurized propellent source cannister 55 through the cannister's exiting mechanism, typically an atomizing spray dispenser/nozzle 58, into and through the internal portion and exiting conduit 59 accompanying the product. As seen in FIG. 2, the nozzle of the instant invention 50 is dimensioned to fit around the external surface of conduit 59 to allow any exiting propellent to traverse the internal portion of conduit 59 and enter into the internal portion of introduction nozzle 50 and exit nozzle tip 24 via said nozzle tip orifice 25.

Figure 2A:
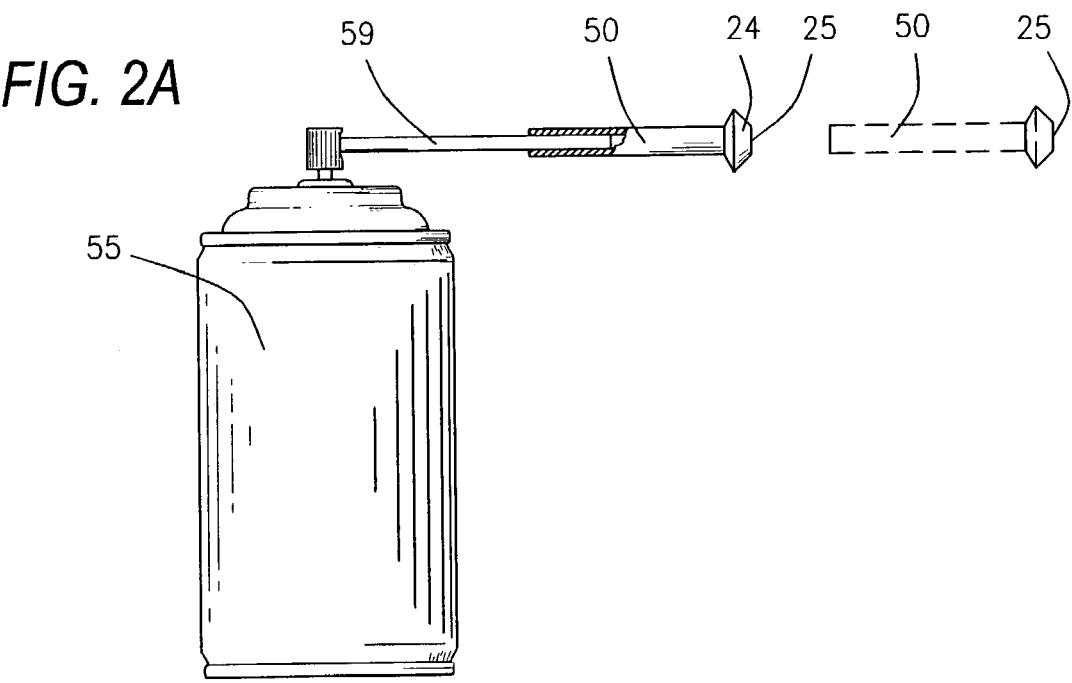
FIG. 2A is an illustration of the alternative embodiment of FIG. 2 further detailing the communication or attachment of the invention's introduction nozzle to the pre-existing pressurized propellent source.
Figure 3:
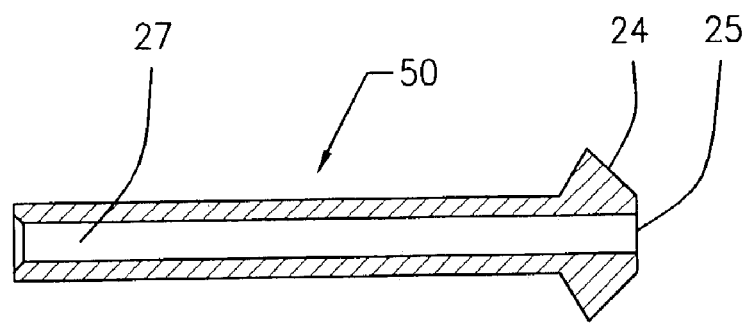
FIG. 3 is an illustration of the nozzle used in association with alternative embodiments 2 and 2A providing further detail of the internal and external structure of the invention introduction nozzle.

FIGS. 2A and 3 illustrate the alternative embodiment of FIG. 2 providing further disclosure regarding the communication or attachment of the invention's alternative introduction nozzle 50 to the pre-existing pressurized propellent source 55. Turning now to FIG. 2A.

FIG. 2A illustrates the connection of nozzle tip 50 to a previously available pressurized propellent source 55 as discussed in association with FIG. 2. FIG. 3 illustrates a cross-sectional view of the alternative embodiment introduction nozzle tip of the instant invention wherein the nozzle is referred to generally as 50 and the nozzle tip as 24, the introduction nozzle orifice 25 and the internal portion of said propellent introduction nozzle indicated as 27 is shown and may be appropriately dimensioned to accommodate the conduit normally provided with readily available pressurized propellent canister sources 55 (not shown in FIG. 3). In FIG. 2A the internal portion of nozzle 50 is typically dimensioned to $^{80}/_{1000}$" and the conduit typically provided with such products dimensioned at an inside diameter of $^{40}/_{1000}$". Consequently, the introduction nozzle of the instant invention may be modified such to accommodate a propellent flow through rate approximating that of the invention's preferred embodiment discussed in association with FIGS. 2 and 2A.

Figure 4:
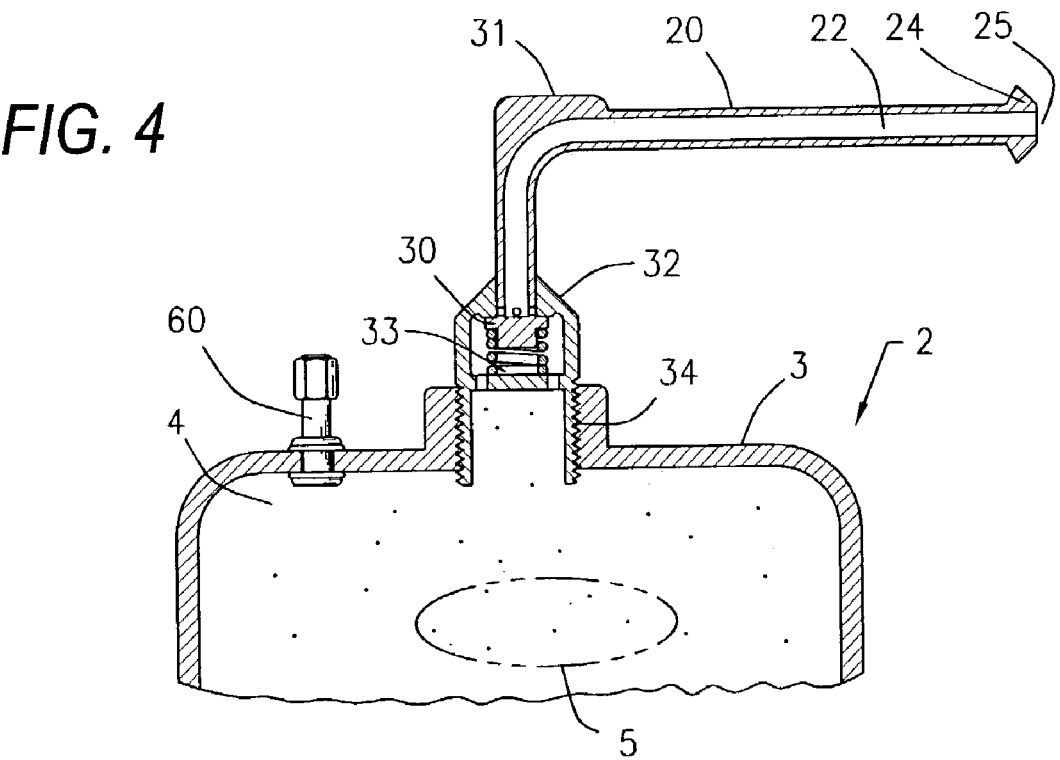
FIG. 4 is a cross-section illustration of the instant invention illustrated in FIGS. 1 and 1A providing further detail with respect to a cannister refill valve mechanism.

FIG. 4 is a cross-section illustration of the instant invention illustrated in FIGS. 1 and 1A providing further detail with respect to a cannister refill valve mechanism 60. Refilling valve 60 is typical of valves readily available in the present art but may be used in conjunction with the instant invention to facilitate the subsequent introduction of a pressurized non-flammable, non-ozone depleting fluorocarbon propellent once the original contents have been partially or completely vacated.

Figure 5:
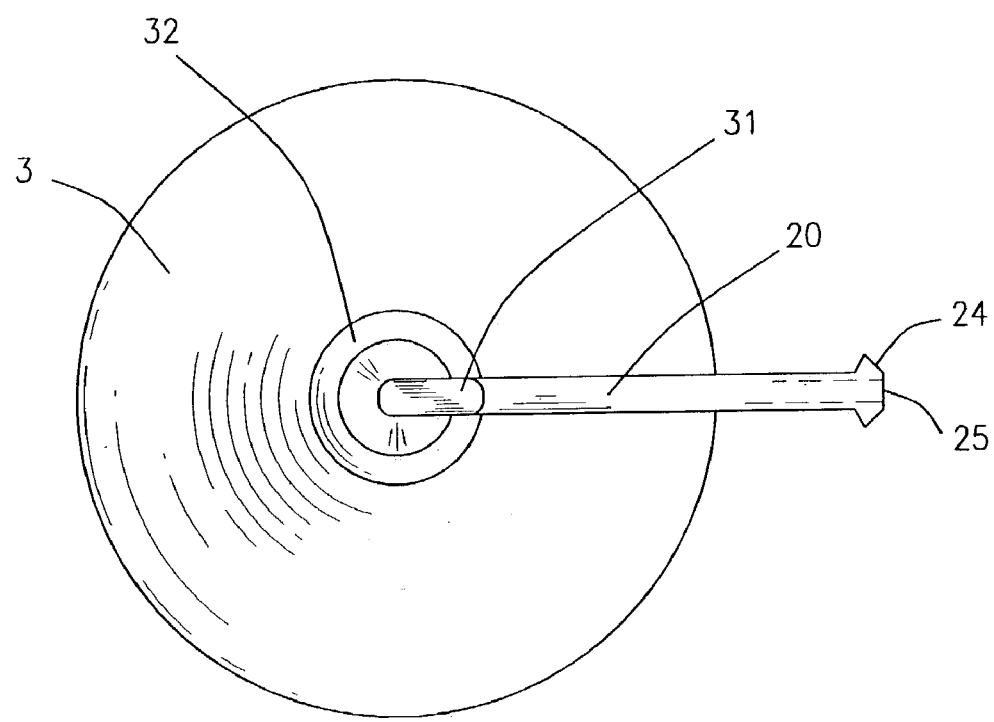
FIG. 5 is a top view illustration of the instant invention of FIGS. 1 and 1A.

FIG. 5 is a top view illustration of the invention of FIGS. 1 and 1A. Turning now to FIG. 5.

FIG. 5 discloses an integrated valve actuation portion 31 of nozzle 20 which provides a resting place for a digit used to exert a downward pressure upon actuation portion 31 and effectuate the exiting of a propellent from the internal portion of cannister 3. Said exiting via downwardly exerted pressure disclosed in association with the discussion of FIGS. 1 through 2A. Exiting gas traverses the internal portion of nozzle 20 and exits said nozzle 20 internal portion via nozzle tip orifice 25 located at nozzle tip 24 of introduction nozzle 20.

What is claimed is:

1. An environmentally friendly insect eradication method, said method comprising:
   providing a canister, said canister having a pressurized gas propellant disposed therein, wherein said pressure is sufficient to introduce essentially all of said gas propellant into an internal portion of an insect bore in a tree via an entrance to the insect bore such that the air pressure in the internal portion of the insect bore substantially increases;
   inserting a gas introduction nozzle provided with said canister into the bore in the tree;
   displacing a valve mechanism connecting the nozzle and the canister such that it causes said propellant to enter the bore such that the air pressure within the bore substantially increases;
   crushing and displacing an invasive insect restively accommodated therein the bore by the force of the substantially increased air pressure within the internal portion of the insect bore; and
   wherein the gas propellant has no biocidal properties.

2. The method of claim 1 wherein the gas propellant within the canister has a pre-use internal pressure within the approximate range of from about 75 psig to about 150 psig.

3. The method of claim 1 wherein said gas propellant is a nonflammable, non-ozone depleting gas.

4. An environmentally friendly insect eradication method, the method comprising the steps of:
   providing a canister, said canister having a pressurized, non-flammable, non-biocidal, non-ozone depleting fluorocarbon propellant disposed therein, the pressurized propellant causing the canister to have a pre-voided internal pressure within the approximate range of from about 75 psig to about 150 psig, wherein said pressure is sufficient to introduce essentially all of said propellant into an internal portion of a bore in a tree via an entrance or exiting insect bore such that the air pressure in the internal portion of the tree or other invaded structure substantially increases;
   inserting a gas introduction nozzle provided with said canister into the bore in the tree;
   displacing a valve mechanism connecting the nozzle and the canister such that it causes said propellant to enter the entrance or exiting bore such that the air pressure within the internal portion of bore substantially increases; and
   crushing and displacing an invasive insect accommodated therein said bore by the force of the substantially increased air pressure within the internal portion of the bore.

* * * * *